Figure 1:
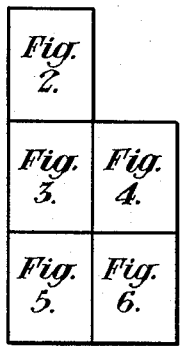

Oct. 25, 1960 E. C. FALKOWSKI 2,958,073
STORAGE CHECKING APPARATUS
Filed April 14, 1958 6 Sheets-Sheet 1

INVENTOR.
Edward C. Falkowski
BY W. L. Stout
HIS ATTORNEY

United States Patent Office 2,958,073
Patented Oct. 25, 1960

2,958,073
STORAGE CHECKING APPARATUS

Edward C. Falkowski, Springdale, Pa., assignor to Westinghouse Air Brake Company, Wilmerding, Pa., a corporation of Pennsylvania Filed Apr. 14, 1958, Ser. No. 728,316

15 Claims. (Cl. 340—173)

My invention relates to information storage equipment, and more specifically to a circuit arrangement for checking the integrity of such equipment before a storage is made therein.

In copending application for Letters Patent of the United States Serial No. 728,230, filed April 14, 1958 by William A. Robison, Jr., for Information Handling System which is assigned to the assignee of my present application, there is disclosed apparatus for storage and transfer information for use in automatic control or indication systems.

In one storage system of the type disclosed in the above-mentioned copending application, the tangent track rolling resistance of cuts of railway cars is measured when each cut occupies the track section in advance of the master retarder in a classification yard and a voltage representative of each measurement is derived and stored in an electronic storage unit until such time as each measurement is needed at a group retarder for controlling the retardation pressure of the retarder. However, if a failure occurs in the electronic storage apparatus, a rolling resistance measurement voltage may be stored in a storage unit which is incapable of retaining the voltage until the time it is needed. It is accordingly, the object of my present invention to provide an arrangement of apparatus for checking the integrity of each storage unit employed in systems of the type disclosed in said copending application before a signal is supplied thereto. If the checked storage unit is determined to be faulty, the signal to be stored is supplied to the next empty storage unit rather than to the faulty one.

Other objects and characteristic features of my invention will become apparent as the description proceeds.

In accomplishing the foregoing object of my invention, in accordance with one specific embodiment of my invention which is adapted to be used with rolling resistance storage and transfer equipment of the class described in the above-mentioned copending application, I employ a source of power of a predetermined voltage for each storage unit, which voltage is supplied to the associated storage unit when the storage equipment is at rest; and a checking relay, requiring the predetermined voltage for a change of state, for each storage unit. Each checking relay is connected to the output of its associated storage unit when a rolling resistance measured voltage is to be stored therein, as hereinafter described.

I shall describe one form of apparatus embodying my invention, and shall then point out the novel features thereof in claims.

I have illustrated an embodiment of my invention which is adapted to be employed in a tangent track rolling resistance storage system of the type disclosed in the above copending application. Only those components of the system disclosed in said copending application which are necessary to make my disclosure complete and to an understanding of my invention have been illustrated, and in some instances these components have been illustrated in block diagram form. However, the correspondence between schematically illustrated components and those shown in the above-mentioned copending application will be readily apparent as the description proceeds.

In order to simplify the illustration of the circuits employed in my invention, I have not shown the necessary power supplies in detail. One of these power supplies is a conventional source of D.C. voltage having positive and negative terminals, connections to which are schematically indicated on the drawings by the reference characters B and N, respectively, associated with arrow symbols indicating connections to the battery terminals. The additional power supplies required are shown schematically by a control lead carried from component to component and a ground lead which is returned to a common ground as conventionally indicated. The aforementioned power sources of predetermined voltage, which will hereinafter be assumed to be, for example, 100 volts, are each represented by a battery, the negative terminal of which is connected to ground and the positive terminal of which is at times connected to a storage unit as will hereinafter be described.

In the drawings—

Fig. 1 is a chart showing the manner in which Figs. 2 through 6 should be arranged in order to see in detail the apparatus arrangement of my invention.

Figs. 2 through 6 when arranged in the manner shown in Fig. 1 comprise a schematic wiring diagram of one embodiment of my invention.

Figure 7:
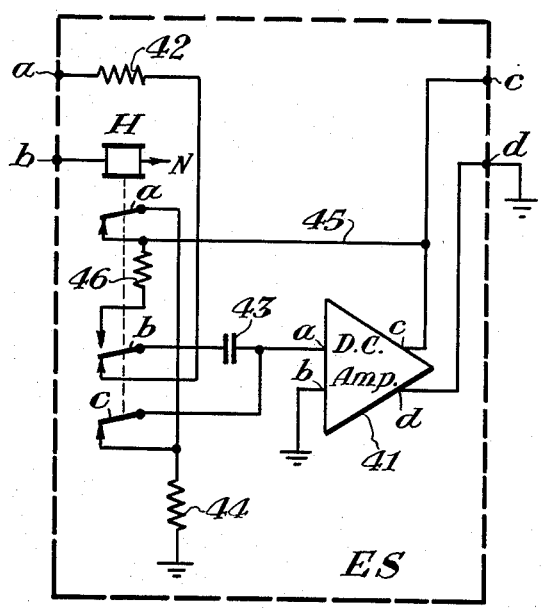

Fig. 7 shows a schematic wiring diagram of an electronic storage unit adapted to be employed with the apparatus of my invention.

Figure 2:
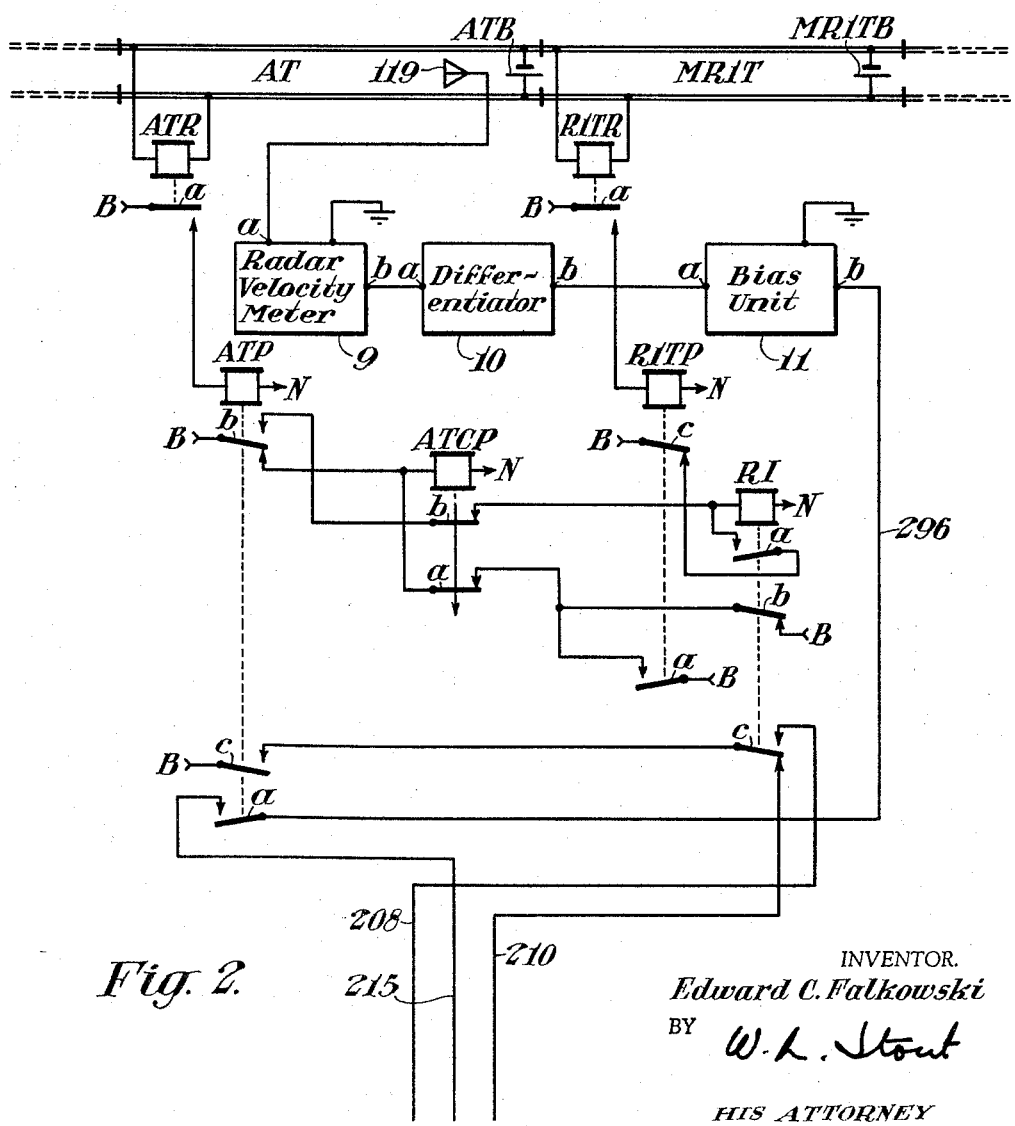

Referring now to the drawings, there are shown in Fig. 2 two track sections designated AT and MR1T. Each of these track sections is provided with a conventional D.C. track circuit including a source of track circuit energy designated ATB and MR1TB in track sections AT and MR1T, respectively; the rails of the respective track sections, and a track relay for each section. The track relays for the sections AT and MR1T are designated ATR and R1TR, respectively, and the track circuits are arranged in a manner well known in the art, such that the relays are picked up when their respective track sections are unoccupied and released when their respective sections are occupied. The circuits controlled by these track relays will be discussed in detail below.

There is also shown in Fig. 2 in block diagram form a radar velocity meter 9 whose output terminal $b$ is connected to the input terminal $a$ of a differentiator 10. The input terminal $a$ of velocity meter 9 is connected to an antenna 119 located at the exit end of track section AT. Velocity meter 9 supplies a velocity signal to differentiator 10 which in turn supplies, from its output terminal $b$, an acceleration signal to input terminal $a$ of a bias unit 11. This unit serves to bias by 100 volts the measured value of acceleration supplied to its input terminal $a$. This bias is required since the electronic storage units employed in my invention are adapted to store only positive voltages. The operation of the radar velocity meter and its antenna, the differentiator, and the bias unit form no part of my invention and reference is made to copending application for Letters Patent of the United States Serial No. 676,730, filed August 7, 1957, by David P. Fitzsimmons and William A. Robison, Jr., for Automatic Control System for Railway Classification Yards, which is assigned to the assignee of my present application, for a full understanding of the operation of said apparatus. It is sufficient for the purposes of this description to point out that the voltage output from terminal $b$ of bias unit 11 is representative of the tangent track rolling resistance measurements to be stored by the apparatus employed in my invention. These measurements are proportional to the acceleration of cars moving in the path of antenna 119 of velocity meter 9.

The output signal from terminal $b$ of bias unit 11 is supplied over a front contact $a$ of a relay ATP to the first empty electronic storage unit of a series of such units located in a series of storage panels as hereinafter described. Said relay ATP is a back contact repeater relay of track relay ATR and is picked up when track section AT is occupied and released when track section AT is unoccupied. Any number of storage units may be employed but for the purposes of this description I have shown six such units as described below.

In addition to relays ATR, ATP, and R1TR there is also shown in Fig. 2 of the drawings track repeater relay R1TP, and control relays RI, and ATCP. Relay ATP is energized by a circuit extending from terminal B of the battery over back contact $a$ of relay ATR, and the winding of relay ATP to terminal N of the battery. Relay R1TP is a back contact repeater of track relay R1TR and is energized by a circuit extending from terminal B of the battery over back contact $a$ of its associated track relay and through the windings of the repeater relay to terminal N of the battery. These track repeater relays are accordingly picked up when their respective track sections are occupied and are released when said sections are unoccupied. Relay RI has a pickup circuit which extends from terminal B of the battery over the front point of contact $b$ of relay ATP, front contact $b$ of relay ATCP and the winding of relay RI to terminal N of the battery. Relay RI has a stick circuit which extends from terminal B of the battery over back contact $c$ of relay R1TP, its own front contact $a$ and through the winding of the relay to battery terminal N. Relay ATCP has a pickup circuit which extends from terminal B of the battery over the back point of contact $b$ of relay ATP and through the winding of the relay to terminal N of the battery. Relay ATCP has a first stick circuit which extends from terminal B of the battery over back contact $b$ of relay RI, its own front contact $a$ and through the winding of the relay to terminal N of the battery. Relay ATCP has a second stick circuit which extends from terminal B of the battery over front contact $a$ of relay R1TP, its own front contact $a$ and through the winding of the relay to terminal N of the battery. It is, therefore, apparent that relay RI is normally released and relay ATCP normally picked up. The purpose and operation of these relays will become apparent as this description proceeds.

The previously mentioned electronic storage units employed in my invention are units 1ES through 6ES which are located in rolling resistance storage panels 1RP through 6RP as shown in Figs. 3 through 6. Since these storage panels, which include both the electronic storage units and storage selection, code generating, storage interrogating and storage cancellation circuits, are substantially identical, only the first, second and last of the six panels are shown in detail. The details of panels 3RP through 5RP may be identical with panel 2RP except for an obvious progressive change in the generated code identifying the panel as will be described. In these panels the storage units such as 1ES, 2ES and 6ES are shown in block form and the storage units in the remaining panels are not shown since they would be identical. For complete details of this storage unit, reference may be had to the copending application for Letters Patent of the United States of James A. Cook, Jr., Serial No. 634,000, for Electronic Storage Device, filed January 14, 1957, and assigned to the assignee of my present application. For present purposes, however, it is sufficient to note that terminals $a$, $b$, $c$ and $d$ on each of the storage units 1ES through 6ES are identical. The voltage to be stored is applied between terminal $a$ and ground terminal $d$. When it is desired to complete the storage, one of the relays 1H through 6H included in storage units 1ES through 6ES, respectively, is energized from terminal B of the battery over external circuitry to be described and through the winding of the selected relays 1H through 6H to terminal N of the battery. The stored voltage may be read out of the unit between output terminal $c$ and ground terminal $d$.

Rolling resistance storage panel 1RP comprises an electronic storage unit 1ES, including relay 1H; and four additional relays 1A, 1B, 1CR and 1RO. Relay 1A (Fig. 3) has a pickup circuit extending from terminal B of the battery over front contact $c$ of relay ATIP in Fig. 2, the front point of contact $c$ of relay RI, lead 208, terminal $r$ of panel 1RP (Fig. 3), the back point of contact $b$ of relay 1B, to be described, back contact $c$ of relay 1RO, to be described, lead 326, the front point of contact $a$ of relay 1CR, to be described, lead 327, and through the winding of relay 1A to terminal N of the battery. Relay 1A has a first stick circuit extending from terminal B of the battery over an additional back contact $d$ of relay 1H in storage unit 1ES (Fig. 4), lead 328, its own front contact $a$, and through the winding of the relay to terminal N of the battery. Relay 1A has a second stick circuit extending from terminal B of the battery over the back point of contact $c$ of relay 1B, its own front contact $a$, and through the winding of the relay to terminal N of the battery.

Figure 3:
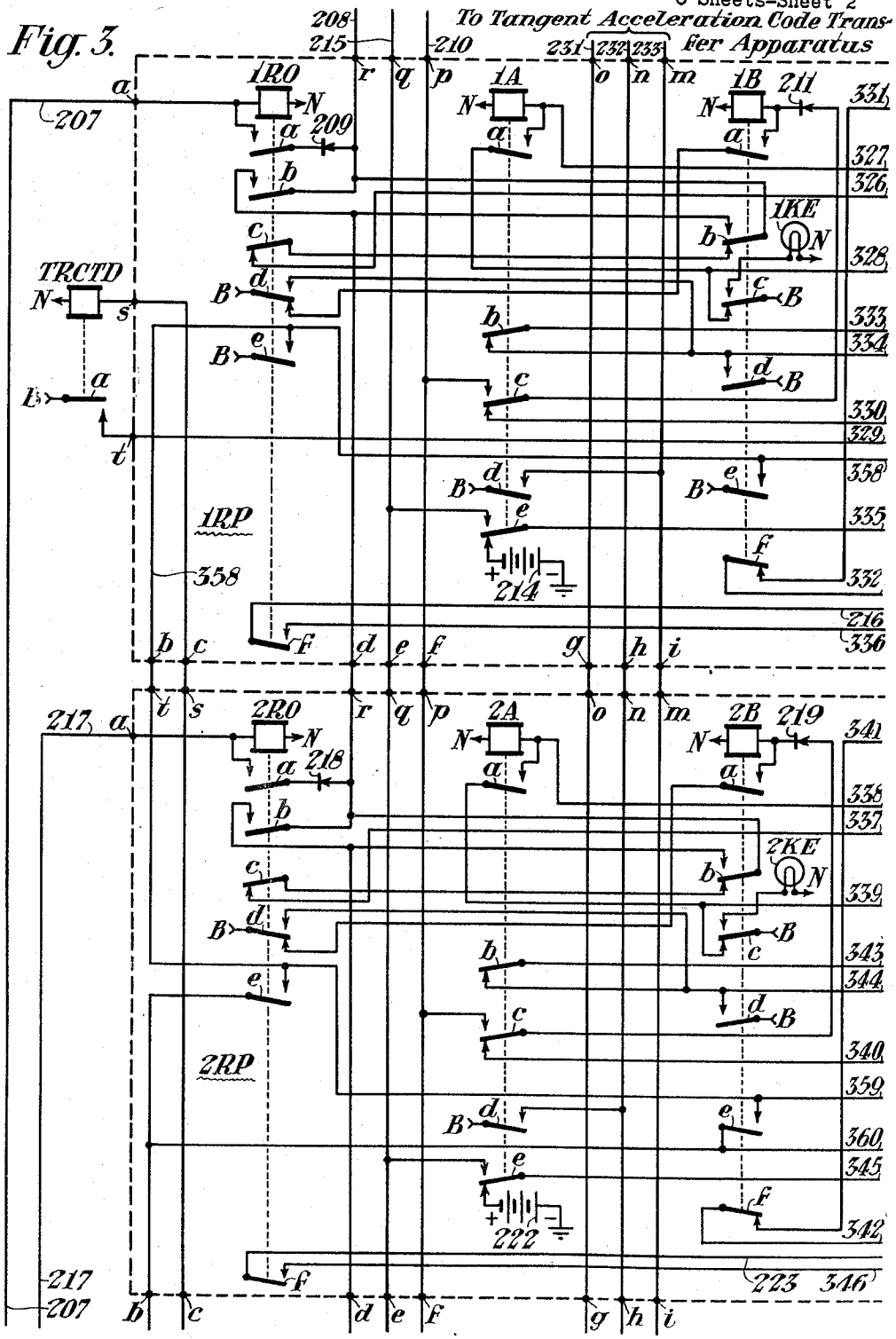
Figure 4:
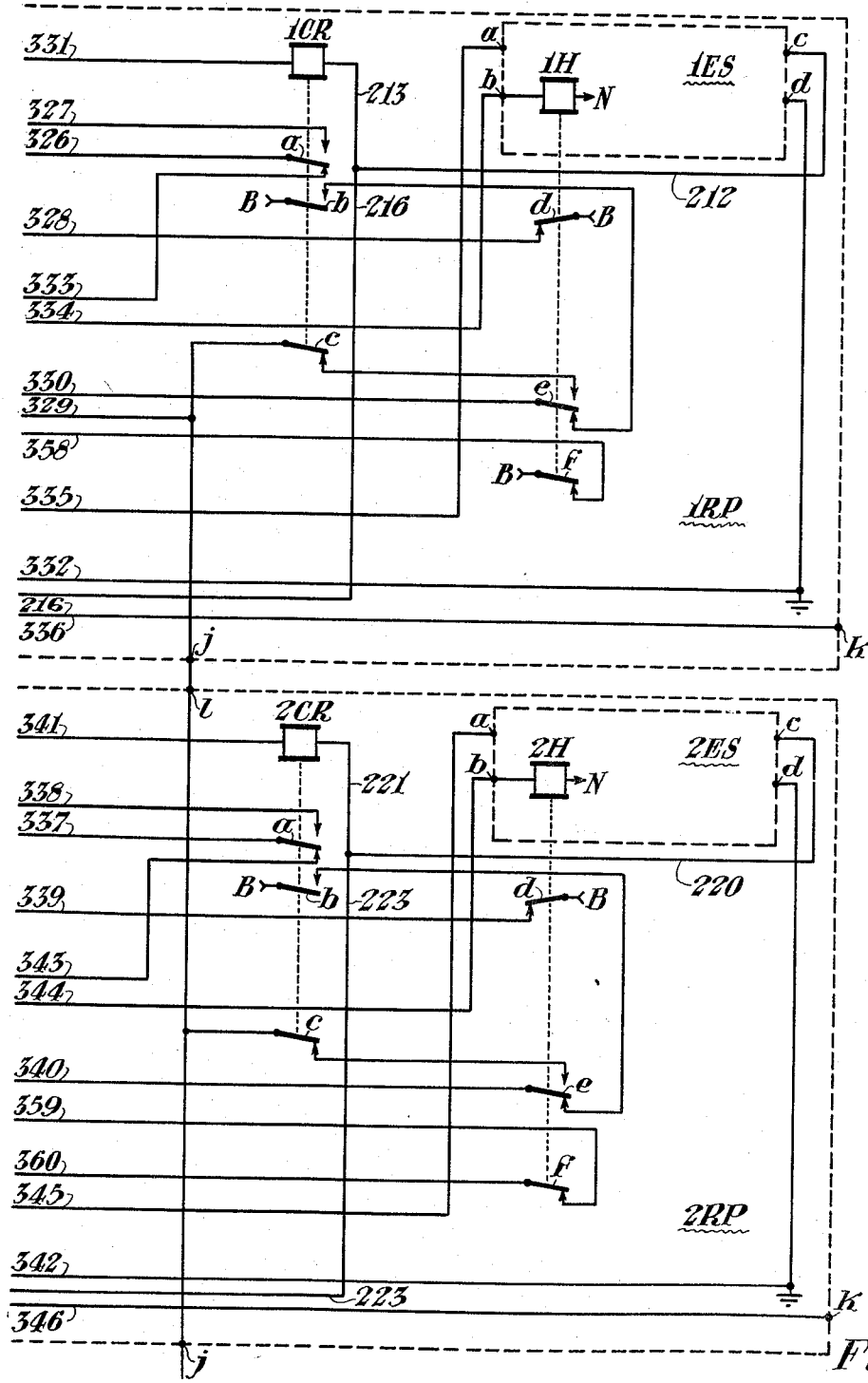
Figure 5:
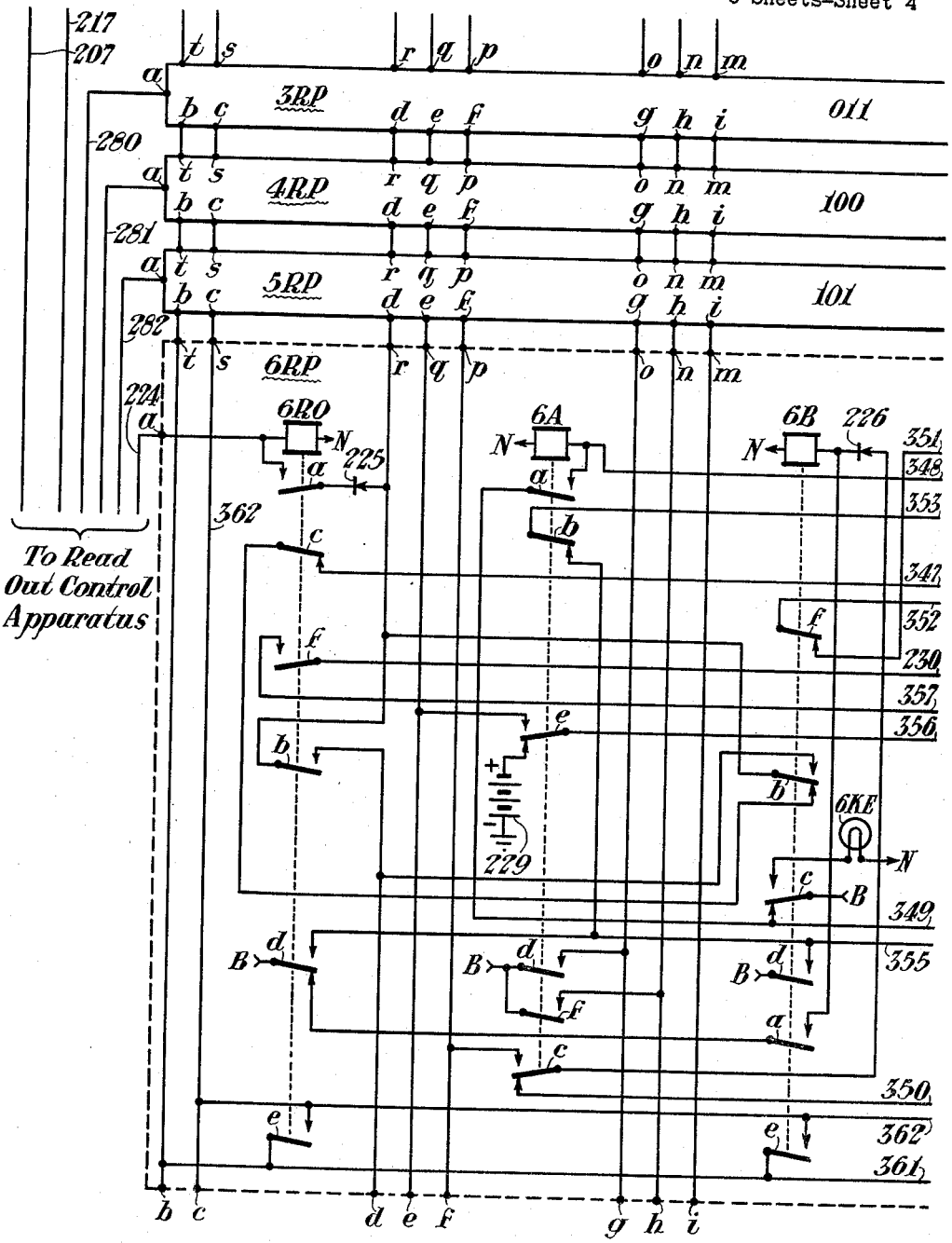
Figure 6:
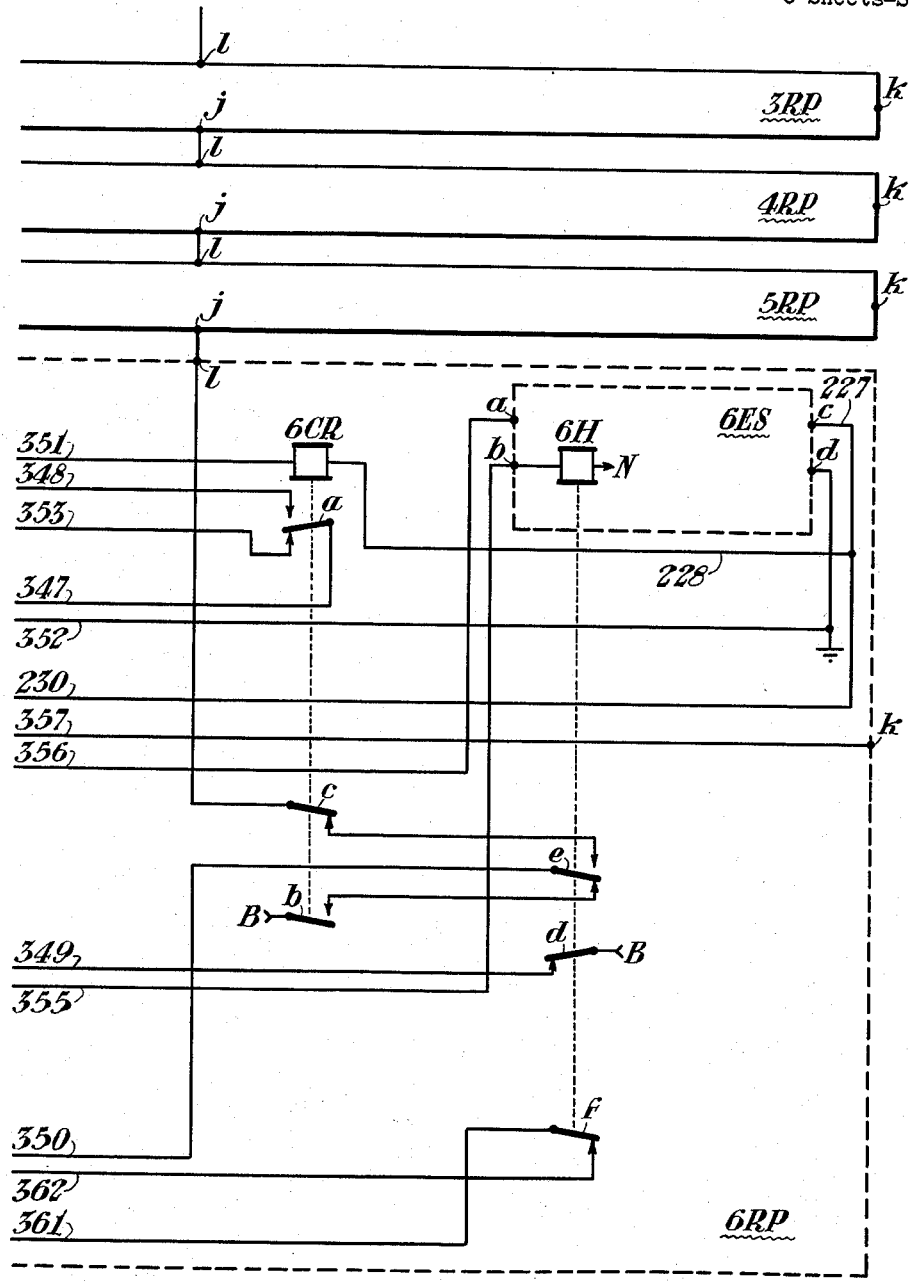

Relay 1B (Fig. 3 has a first pickup circuit extending from terminal B of the battery over front contact $c$ of relay ATP in Fig. 2, the back point of contact $c$ of relay RI, lead 210, terminal $p$ of panel 1RP, the front point of contact $c$ of relay 1A, and through rectifier 211, which serves to prevent sneak circuits and the winding of relay 1B to terminal N of the battery. Relay 1B has a second pickup circuit extending from terminal B of the battery over back contact $a$ of relay TRTCD, to be described, to terminal $t$ of panel 1RP, lead 329, over back contact $c$ of relay 1CR, the front point of contact $e$ of relay 1H, lead 330, the back point of contact $c$ of relay 1A, through rectifier 211, and through the winding of relay 1B to terminal N of the battery. Relay 1B has a third pick-up circuit which extends from terminal B of the battery over front contact $b$ of relay 1CR, the back point of contact $e$ of relay 1H, lead 330, the back point of contact $c$ of relay 1A, through rectifier 211, and through the winding of relay 1B to terminal N of the battery. Relay 1B has a stick circuit which extends from terminal B of the battery over the back point of contact $d$ of relay 1RO, its own front contact $a$, and through the winding of the relay to terminal N of the battery.

Relay 1CR (Fig. 4) has a pickup circuit extending from output terminal $c$ of storage unit 1ES over leads 212 and 213, through the winding of relay 1CR, and over lead 331, back contact $f$ of relay 1B, and lead 332 to ground. Relay 1CR is picked up, as hereinafter described, whenever a voltage signal is to be stored in unit 1ES.

Relay 1H (Fig. 4) has a first pickup circuit extending from terminal B of the battery in Fig. 2, over front contact $c$ of relay ATP, the front point of contact $c$ of relay RI, lead 208, terminal $r$ of panel 1RP, the back point of contact $b$ of relay 1B, back contact $c$ of relay 1RO, lead 326, the back point of contact $a$ of relay 1CR, lead 333, back contact $b$ of relay 1A, lead 334, terminal $b$ of storage unit 1ES, and through the winding of relay 1H to terminal N of the battery. Relay 1H has a second pickup circuit extending from terminal B of the battery over front contact $d$ of relay 1B and lead 334 to terminal $b$ of storage unit 1ES and through the winding of relay 1H to terminal N of the battery. Relay 1H has a third pickup circuit extending from terminal B of the battery over the front point of contact $d$ of relay 1RO and lead 334 to terminal $b$ of storage unit 1ES, and thence through the winding of relay 1H to terminal N of the battery.

Electronic storage unit 1ES has a first input circuit extending from ground through a 100 volt battery 214, and over the back point of contact $e$ of relay 1A and lead 335 to terminal $a$ of unit 1ES, and thence through the unit to ground at grounded terminal $d$ of unit 1ES. Storage unit 1ES has a second input circuit extending from terminal $b$ of bias unit 11, in Fig. 2, previously described, over front contact $a$ of relay ATP (Fig. 2), lead 215, terminal $q$ of panel 1RP (Fig. 3) and over the front point of contact $e$ of relay 1A and lead 335 to terminal $a$ of electronic storage unit 1ES and through the unit to ground at grounded terminal $d$. Electronic storage unit 1ES has an output circuit extending between grounded terminal $d$ and terminal $c$ and from terminal $c$ over leads 212 and 216 to front contact $f$ of relay 1RO and thence over lead 336 to output terminal $k$ of panel 1RP.

As previously mentioned, the electronic storage units employed in the various described storage panels 1ES through 6ES in my system are fully described and claimed in the copending application of James A. Cook, Jr., Serial No. 634,000. The structure and operation of these units are typified by unit ES, the details of which are shown schematically in Fig. 7. As shown, unit ES comprises a D.C. amplifier 41 having an input circuit between terminal $a$ and grounded terminal $b$ of the amplifier and an output between terminal $c$ and grounded terminal $d$ of the amplifier.

As described in copending application Serial No. 634,000, the input signal to be stored is applied to terminal $a$ of storage unit ES and thence through a resistor 42, the back point of contact $b$ of relay H, capacitor 43, back contact $c$ of relay H, and through resistor 44 to ground. In the condition shown, output terminal $c$ of amplifier 41 is connected over lead 45, back contact $a$ of relay H, and through resistor 44 to ground to provide a first feedback circuit to the amplifier. Resistor 44 is thus connected in shunt with the input and output circuits of the amplifier. With relay H deenergized, the signal applied to terminal $a$ of storage unit ES causes current to flow through resistor 42, capacitor 43 and resistor 44 in series. While the capacitor is charged, the input and output circuits of amplifier 41 are connected together and shounted by resistor 44. Accordingly, a voltage will be developed at the output of the amplifier in accordance with the internal characteristics of the amplifier. This voltage will appear across resistor 44. The polarity of this voltage may be equal or opposite to that provided by the applied signal. If the voltages are opposite in polarity, capacitor 43 will be charged to a voltage equal to the difference between the applied signal voltage and the voltage developed by the amplifier across resistor 44. If the voltages are of the same polarity, the capacitor will be charged to a voltage equal to the sum of the applied signal and the voltage across resistor 44. In either event, the capacitor is charged to a voltage which differs from the voltage applied to terminal $a$ of unit ES by the voltage developed across resistor 44.

The circuit constants are so chosen that capacitor 43 is charged rapidly. When relay H is energized, the connection between the amplifier output circuit and the input circuit is interrupted at the open back point of contact $a$ of relay H. The circuit for resistor 44 is now opened at the open back point of contact $c$ of relay H. The applied signal is now disconnected at the open back point of contact $b$ of relay H. The closing of the front point of contact $b$ of relay H now connects a resistor 46 in series with capacitor 43 in a feedback path between input terminal $a$ and output terminal $c$ of amplifier 41. A high value is chosen for resistor 46, and since the amplifier is arranged to have negligible current flowing in the input circuit, capacitor 43 retains its charge for a relatively long period of time, during which the stored value of the applied signal is available between terminal $c$ and grounded terminal $d$ of the electronic storage unit ES.

Panel 2RP (Figs. 3 and 4) comprises an electronic storage unit 2ES, including a relay 2H; and four addition relays 2RO, 2A, 2B and 2CR. Relay 2A (Fig. 3) has a pickup circuit extending from terminal B of the battery over front contact $c$ of relay ATP in Fig. 2, the front point of contact $c$ of relay RI, lead 208, terminal $r$ of panel 1RP, and from terminal $r$ to terminal $d$ of panel 1RP over two alternate paths, the first including front contact $b$ of relay 1RO, and the second including the front point of contact $b$ of relay 1B; from terminal $d$ of panel 1RP to terminal $r$ of panel 2RP, over the back point of contact $b$ of relay 2B, to be described, back contact $c$ of relay 2RO, to be described, lead 337, the front point of contact $a$ of relay 2CR, lead 338 and through the winding of relay 2A to terminal N of the battery. Relay 2A has a first stick circuit extending from terminal B of the battery over back contact $d$ of relay 2H, lead 339, front contact $a$ of relay 2A, and through the winding of the relay to terminal N of the battery. Relay 2A has a second stick circuit which extends from terminal B of the battery over the back point of contact $c$ of relay 2B, front contact $a$ of relay 2A, and through the winding of the relay to terminal N of the battery.

Relay 2B (Fig. 3) has three pickup circuits. The first extends from terminal B of the battery over front contact $c$ of relay ATP in Fig. 2, the back point of contact $c$ of relay RI, lead 210, terminal $p$ of panel 1RP, terminal $f$ of panel 1RP, terminal $p$ of panel 2RP, the front point of contact $c$ of relay 2A, through rectifier 219, which serves to prevent sneak circuits, and through the winding of relay 2B to terminal N of the battery. The second pickup circuit for relay 2B extends from terminal B of the battery over front contact $b$ of relay 2CR, the back point of contact $e$ of relay 2H, lead 340, the back point of contact $c$ of relay 2A, through rectifier 219, and through the winding of relay 2B to terminal N of the battery. Relay 2B has a third pickup circuit extending from terminal B of the battery over back contact $a$ of relay TRCTD to terminal $t$ of panel 1RP, lead 328, terminal $j$ of panel 1RP, terminal $l$ of panel 2RP, over back contact $c$ of relay 2CR, the front point of contact $e$ of relay 2H, lead 340, the back point of contact $c$ of relay 2A, and through rectifier 219 and the winding of relay 2B to terminal N of the battery. Relay 2B has a stick circuit extending from terminal B of the battery over the back point of contact $d$ of relay 2RO, front contact $a$ of relay 2B, and through the winding of the relay to terminal N of the battery.

Relay 2CR (Fig. 4) has a pickup circuit extending from output terminal $c$ of storage unit 2ES over leads 220 and 221, through the winding of relay 2CR, over lead 341, over back contact $f$ of relay 2B, and over lead 342 to ground. Relay 2CR is accordingly picked up, as hereinafter described, whenever a stored test voltage appears between terminal $c$ of unit 2ES and ground terminal $d$.

Relay 2H (Fig. 4) has four pickup circuits. The first and second extend from terminal B of the battery over front contact $c$ of relay ATP in Fig. 2, the front point of contact $c$ of relay RI, lead 208, terminal $r$ of panel 1RP, from terminal $r$ to terminal $d$ of panel 1RP over two alternate paths, the first including front contact $b$ of relay 1RO and the second including the front point of contact $b$ of relay 1B, from terminal $d$ of panel 1RP to terminal $r$ of panel 2RP, over the back point of contact $b$ of relay 2B, back contact $c$ of relay 2RO, lead 337, the back point of contact $a$ of relay 2CR, lead 343, back contact $b$ of relay 2A, lead 344, terminal $b$ of unit 2ES, and through the winding of relay 2H to terminal N of the battery. The third pickup circuit for relay 2H extends from terminal B of the battery over front contact $d$ of relay 2B and lead 344 to terminal $b$ of unit 2ES and through the winding of relay 2H to terminal N of the battery. The fourth pickup circuit for relay 2H extends from terminal B of the battery over the front point of contact $d$ of relay 2RO and thence over lead 344 to terminal $b$ of unit 2ES and through the winding of relay 2H to terminal N of the battery.

Storage unit 2ES has two input circuits, the first extending from ground through battery 222 over the back point of contact *e* of relay 2A and lead 345 to input terminal *a* of storage unit 2ES and through the unit to grounded terminal *d*, and the second extending from ground through bias unit 11 in Fig. 2 to terminal *b* of unit 11, over lead 296, front contact *a* of relay ATP, lead 215, terminal *q* of panel 1RP, terminal *e* of panel 1RP, terminal *q* of panel 2RP, and over the front point of contact *e* of relay 2A and lead 345 to input terminal *a* of unit 2ES. Storage unit 2ES has an output circuit extending from ground terminal *d* through the unit to output terminal *c*, and over leads 220 and 223, front contact *f* of relay 2RO and lead 346 to output terminal *k* of panel 2RP.

Panels 3RP through 5RP (Figs. 5 and 6) are identical with panel 2RP just described, their internal circuitry corresponding to the circuits connected to terminals *d* through *r* in panel 2RP, with the exception to be noted hereinafter concerning the tangent acceleration code which has an individual combination for each panel.

Panel 6RP (Figs. 5 and 6) comprises an electronic storage unit 6ES, including a relay 6H; and four additional relays 6RO, 6A, 6B, and 6CR.

Relay 6A (Fig. 5) has a multiple pickup circuit extending from terminal B of the battery over front contact *c* of relay ATP in Fig. 2, the front point of contact *c* of relay RI, lead 208, terminal *r* of panel 1RP, over either front contact *b* of relay 1RO or the front point of contact *b* of relay 1B to terminal *d* of panel 1RP; from terminal *d* of panel 1RP to terminal *r* of panel 2RP, from terminal *r* to terminal *d* of each of panels 2RP through 5RP over a front contact of either the RO or the B relay in each panel, for example front contact *b* of relay 2RO or the front point of contact *b* of relay 2B in panel 2RP, from terminal *d* of panel 5RP to terminal *r* of panel 6RP, over the back point of contact *b* of relay 6B, to be described, back contact *c* of relay 6RO, to be described, lead 347, the front point of contact *a* of relay 6CR, lead 348, and through the winding of relay 6A to terminal N of the battery. Relay 6A has a first stick circuit extending from terminal B of the battery over back contact *d* of relay 6H, lead 349, front contact *a* of relay 6A, and through the winding of the relay to terminal N of the battery. Relay 6A has a second stick circuit extending from battery terminal B over the back point of contact *c* of relay 6B, front contact *a* of relay 6A, and through the winding of the relay to battery terminal N.

Relay 6B (Fig. 5) has three pickup circuits. The first extends from terminal B of the battery over front contact *c* of relay ATP in Fig. 2, the back point of contact *c* of relay RI, lead 210, terminal *p* of panel 1RP, and thence over a continuous lead including terminal *f* of panel 1RP, and terminals *p* and *f* of each of panels 2RP through 5RP, terminal *p* of panel 6RP, the front point of contact *c* of relay 6A, through a rectifier 226, included to prevent sneak circuits, and through the winding of relay 6B to terminal N of the battery. Relay 6B has a second pickup circuit extending from terminal B of the battery over front contact *b* of relay 6CR, the back point of contact *e* of relay 6H, lead 350, the back point of contact *c* of relay 6A, and through rectifier 226 and the winding of relay 6B to terminal N of the battery. Relay 6B has a third pickup circuit extending from terminal B of the battery over back contact *a* of relay TRCTD (Fig. 3) to terminal *t* of panel 1RP, lead 329, and thence over a continuous lead including terminals *j* of panel 1RP, and *l* and *j* of panels 2RP through 5RP, to terminal *l* of panel 6RP, and thence over back contact *c* of relay 6CR, the front point of contact *e* of relay 6H, lead 350, the back point of contact *c* of relay 6A, and through rectifier 226 and the winding of relay 6B to terminal N of the battery. Relay 6B has a stick circuit extending from terminal B of the battery over the back point of contact *d* of relay 6RO, front contact *a* of relay 6B, and through the winding of the relay to terminal N of the battery.

Relay 6CR (Fig. 6) has a pickup circuit extending from output terminal *c* of storage unit 6ES over leads 227 and 228, through the winding of relay 6CR, lead 351, and over back contact *f* of relay 6B and lead 352 to ground. Relay 6CR is accordingly picked up, in a manner similar to that hereinafter described for relay 1CR, whenever a stored test voltage appears between ground terminal *d* and output terminal *c* of unit 6ES.

Relay 6H (Fig. 6) has three pickup circuits. The first is a multiple circuit extending from terminal B of the battery over front contact *c* of relay ATP in Fig. 2, the front point of contact *c* of relay RI, lead 208, terminal *r* of panel 1RP from terminal *r* to terminal *d* of panel 1RP over alternate paths including front contact *b* of relay 1RO and the front point of contact *b* of relay 1B, respectively, from terminal *d* of panel 1RP to terminal *r* of panel 2RP, and thence from terminal *r* to terminal *d* of each of panels 2RP through 5RP over alternate paths in each unit including a front contact of the RO relay in one path and a front point of a contact of the B relay in the other path, and from terminal *d* of panel 5RP to terminal *r* of panel 6RP, over the back point of contact *b* of relay 6B, back contact *c* of relay 6RO, lead 347, the back point of contact *a* of relay 6CR, lead 353, back contact *b* of relay 6A, and lead 355 to terminal *b* of unit 6ES, and through the winding of relay 6H to terminal N of the battery. The second pickup circuit extends from terminal B of the battery over front contact *d* of relay 6B, and lead 355 to terminal *b* of storage unit 6ES and through the winding of relay 6H to terminal N of the battery. The third circuit for relay 6H extends from terminal B of the battery over the front point of contact *d* of relay 6RO and thence over lead 355 to terminal *b* of unit 6ES and through the winding of relay 6H to terminal N of the battery.

Storage unit 6ES (Fig. 6) has two input circuits. The first input circuit for storage unit 6ES extends from ground in bias unit 11 in Fig. 2 to terminal *b* of unit 11, lead 296, and thence over front contact *a* of relay ATP, lead 215, and over a continuous lead including terminals *q* and *e* of panel 1RP through 5RP to terminal *q* of panel 6RP, and over the front point of contact *e* of relay 6A and lead 356 to input terminal *a* of unit 6ES and through the unit to ground terminal *d*. The second pickup circuit extends from ground through battery 229, over the back point of contact *e* of relay 6A, and thence over lead 356 to input terminal *a* of unit 6ES and through the unit to grounded terminal *d*. Unit 6ES has an output circuit extending between grounded terminal *d* and output terminal *c* and from output terminal *c* over leads 227 and 230 to front contact *f* of relay 6RO and thence over lead 357 to output terminal *k* of panel 6RP.

Relay TRCTD (Fig. 3) has a pickup circuit network including a multiple path through each of panels 1RP through 6RP. In panel 1RP, three parallel paths are provided to terminal *b* of panel 1RP, the first extending from terminal B of the battery over back contact *f* of relay 1H and lead 358 to terminal *b*, the second extending from terminal B of the battery over front contact *e* of relay 1B and lead 358 to terminal *b*, and the third extending from terminal B of the battery over front contact *e* of relay 1RO and lead 358 to terminal *b* of panel 1RP. Terminal *b* of panel 1RP is connected to terminal *t* of panel 2RP. There are three paths from terminal *t* of panel 2RP to terminal *b* of panel 2RP. These paths comprise front contact *e* of relay 2RO, front contact *e* of relay 2B, and lead 359 over back contact *f* of relay 2H and lead 360. Terminal *b* of panel 2RP is connected to terminal *t* of panel 3RP, and in a similar manner panel 3RP is connected to panel 4RP, panel 4RP is connected to panel 5RP, and terminal *b* of panel 5RP is connected to terminal *t* of panel 6RP. Each of the paths between terminal *d* and terminal *b* in panels 3RP through 5RP has the three paths shown in connection with the similar terminals in panel 2RP. Terminal *t* of panel 6RP is connected to terminal *s* of panel 6RP over leads 361 and 362 in a similar combination of paths, that is, between leads 361 and 362 over a first path including front contact *e* of relay 6RO, a second path including front contact *e* of relay 6B, and a third path including back contact *f* of relay 6H. Terminal *s* of panel 6RP is connected to one side of the winding of relay TRCTD over a continuous lead including terminals *c* and *s* of each of panels 1RP through 5RP. The opposite side of the winding of relay TRCTD is connected to terminal N of the battery as shown. Relay TRCTD is accordingly picked up if, in all of the panels, either the RO or B relay is picked up or the H relay is released.

It will be noted that a group of three leads runs through each of panels 1RP through 6RP. A first lead 231 extends over a path including terminals *o* and *g* of panels 1RP through 5RP, and terminal *o* of panel 6RP. A second lead 232 extends over a path including terminals *n* and *h* of panels 1RP through 5RP, and terminal *n* of panel 6RP. The third lead 233 extends over a path including terminals *m* and *i* of panels 1RP through 5RP, and terminal *m* of panel 6RP. Within each of the panels is included a contact or combination of contacts of the A relay for the panel which energizes leads 231 through 233 in an individual code combination for each panel. In the illustrated embodiment of my invention, since six panels are shown, not all of the energized and deenergized combinations of leads 231, 232 and 233 are required to identify the panels. As illustrated, the panel identifying code chosen in a binary code ranging from binary 1, or 001, to binary 6, or 110, where a 1 indicates an energized line and a 0 indicates a deenergized line in the manner well known in the art. In panel 1RP, as will hereinafter appear, selection of the panel for the storage of a voltage results in the pick up of relay 1A, which energizes lead 233 from terminal B of the battery over the front contact *d* of relay 1A and leaves leads 231 and 232 deenergized to generate the binary code combination 001. Similarly, in panel 2RP front contact *d* of relay 2A connects terminal B of the battery to lead 232 to generate the code sequence 010. Similar contacts of the A relays in panels 3RP through 5RP are used to energize leads 231, 232 and 233 in the respective code sequences 011, 100, and 101, respectively. In panel 6RP, front contacts *d* and *f* of relay 6A energize leads 231 and 232 to generate the identifying sequence 110. The code on leads 231, 232 and 233 is called the tangent acceleration code. The circuits and apparatus for receiving, transferring, and interpreting this tangent acceleration code form no part of my present invention and the above information is sufficient for purposes of this description. Reference is made to the aforementioned copending application Serial No. 728,230 filed by William A. Robison, Jr. for a more complete description of the utilization of the tangent acceleration codes.

Panels 1RP through 6RP each contain a relay designated 1RO through 6RO, respectively. These relays are "read out" relays and are energized when it is desired to read out of their associated storage panels the rolling resistance measurement voltage stored therein. For example, relay 1RO (Fig. 3) is picked up through circuits, not shown, by connecting lead 207 to terminal B of the battery through said circuits, the remainder of the pickup circuit for the relay extending through the winding of the relay to terminal N of the battery. When picked up, relay 1RO completes a stick circuit extending from terminal B of the battery over front contact *c* of relay ATP in Fig. 2, the front point of contact *c* of relay RI, lead 208, terminal *r* of panel 1RP (Fig. 3) through a rectifier 209, which serves to prevent sneak circuits and over front contact *a* of relay 1RO and through the winding of relay 1RO to terminal N of the battery. Relays 2RO through 6RO also each have a pickup circuit, not shown, by which terminal B of the battery is connected to leads 217, 280, 281, 282 and 224, respectively, when it is desired to read out the value of voltage stored in the storage unit associated with each relay. These circuits extend through the winding of each relay to terminal N of the battery. Relays 2RO through 6RO each have a multiple stick circuit extending from terminal B of the battery over front contact *c* of relay ATP in Fig. 2, the front point of contact *c* of relay RI, lead 208, terminal *r* of each preceding panel, front contact *b* of the B relay in each preceding panel or front contact *b* of the RO relay in each preceding panel to terminal *d* of each preceding panel, and thence through a rectifier similar to references 218 and 225 in Figs. 3 and 5, respectively, and through the winding of the proper relay to terminal N of the battery. For a complete description of the operation of the pickup circuits for the RO relays to read out a value of voltage stored in their associated storage units and to cancel the storages to make the associated panels available for subsequent storages, reference is made to the aforementioned copending application, Serial No. 728,230 filed April 14, 1958 by William A. Robison, Jr. The connecting of the output terminal *c* of storage units 1ES through 6ES over front contacts *f* of relays 1RO through 6RO, respectively, to output terminals *k* of panels 1R through 6R, respectively has been described above. The use of the stored voltages made available at output terminals *k* forms no part of my present invention and reference is again made to said copending application Serial No. 728,230, for a description of the circuits and apparatus connected to the output of terminals *k*.

The operation of the storage equipment described in storing a measurement of tangent track rolling resistance and generating a tangent acceleration code identifying the selected storage panel will now be described.

Initially, all relays concerned in the operation to be described are released, except for track relays ATR and R1TR (Fig. 2) which are normally picked up over the track circuits associated with sections AT and MR1T, respectively; relay ATCP, which is normally held up over its circuit previously traced and including the back point of contact *b* of relay ATP; and relay TRCTD, which is held up over its previously traced circuit extending from terminal B of the battery over back contacts *f* of each of relays 1H through 6H and through the winding of the relay to terminal N of the battery. Electronic storage units 1ES through 6ES are energized over one of their traced input circuits. In panel 1RP, this circuit includes battery 214 and the back point of contact *e* of relay 1A. In panel 2RP, this circuit includes battery 222 and the back point of contact *e* of relay 2A, and identical circuits are provided in panels 3RP through 5RP. In panel 6RP, this circuit includes battery 229 and the back point of contact *e* of relay 6A. A reference voltage, having a magnitude of, for example, 100 volts, is accordingly applied between input terminal *a* and grounded terminal *d* of storage units 1ES through 6ES. However, since relays 1H through 6H are down at this time, no output voltage appears across terminals *c* and *d* of the storage units 1ES through 6ES at this time.

Now, assume that a car rolling down the hump enters track section AT and shunts track relay ATR (Fig. 2), closing its back contact *a* and causing relay ATP (Fig. 2) to pick up over its previously traced pickup circuit. With relay ATP picked up, and with the car rolling in section AT in the path of antenna 199 of radar velocity meter 9, the output of radar velocity meter 9 which is differentiated in differentiator 10 and biased in bias unit 11 as described in the aforementioned copending application Serial No. 676,730, filed August 7, 1957, by David P. Fitzsimmons and William A. Robison, Jr. is connected from terminal *b* of bias unit 11 over lead 296, front contact *a* of relay ATP and lead 215 to terminal *q* of panel 1RP and thence through a continuous lead in panels 1RP through 6RP. However, the circuit is interrupted in each of the panels at the open front point of contact *e* of relays 1A through 6A.

With relay ATP up, relay RI is now picked up over its previously traced circuit including the front point of contact *b* of relay ATP, and front contact *b* of relay ATCP, and sticks up over its previously traced stick circuit including back contact *c* of relay R1TP and front contact *a* of relay RI. Since relay R1TP is down at this time, when relays ATP and RI are both picked up all the circuits for relay ATCP are interrupted and this relay will release after its time delay, which is adjusted to a small value just sufficient to insure the pick up of relay RI.

With relays ATP and RI picked up, a circuit extends from terminal B of the battery over front contact *c* of relay ATP and the front point of contact *c* of relay RI to lead 208 and terminal *r* of rolling resistance storage unit 1RP. From terminal *r*, a pickup circuit is then completed for relay 1H which extends from terminal *r* over the back point of contact *b* of relay 1B, back contact *c* of relay 1RO, lead 326, the back point of contact *a* of relay 1CR, lead 333, back contact *b* of relay 1A, lead 334, and through the winding of relay 1H to terminal N of the battery.

Relay 1H now picks up and the voltage from battery 214 which is applied to the input circuit of storage unit 1ES, over the circuit previously traced, is stored, thus causing an output voltage to appear between terminals *c* and *d* of electronic storage unit 1ES.

With relay 1H picked up, relay TRCTD is released due to the opening of its energizing circuit at the open back point of contact *f* of relay 1H.

With a stored voltage applied to terminal *c* of unit 1ES, relay 1CR picks up over its previously traced circuit extending from terminal *c* of unit 1ES, through the winding of relay 1CR, and over back contact *f* of relay 1B to ground. This operation and associated apparatus constitutes my invention and is employed with the invention disclosed and claimed in the aforesaid copending application Serial No. 728,230 filed April 14, 1958, by William A. Robison, Jr. for the purpose of checking the integrity and operation of the storage units employed in that application. As previously pointed out, battery 214 constitutes a source of power of 100 volt potential and relay 1CR requires a 100 volt pickup voltage. As will become apparent as this description proceeds, relay 1CR will fail to pick up if the storage unit 1ES is incapable of storing the 100 volt potential supplied thereto from battery 214, signifying the inoperativeness of the storage unit, and any rolling resistance measurement voltage to be stored will be transferred to the next empty and operative storage unit.

With relay 1CR picked up to indicate that the storage unit is operating properly, the previously traced circuit for relay 1A, which includes front contact *c* of relay ATP, the front point of contact *c* of relay RI, lead 208, the back point of contact *b* of relay 1B, back contact *c* of relay 1RO, the winding of relay 1A, and the front point of contact *a* of relay 1CR, is completed and relay 1A picks up.

With relay 1A picked up, the three circuits traced for relay 1H are all open at the open back point of contact *b* of relay 1A, the open front contact *d* of relay 1B, and the open front point of contact *d* of relay 1RO. Relay 1H is accordingly released. With relay 1H released, the stored voltage is removed from terminal *c* of unit 1ES and relay 1CR is released. However, relay 1A remains up over its two stick circuits previously traced, which include back contacts *d* of relay 1H and *c* of relay 1B in multiple and front contact *a* of relay 1A. Reference is made to aforementioned copending application, Serial No. 634,000 for an understanding of how the stored voltage is removed from terminal *c* of the storage unit when relay 1H is released.

With relay 1A picked up, the second input circuit for storage unit 1ES is completed from the previously traced energizing circuit for lead 215 from bias unit 11 over lead 296 and front contact *a* of relay ATP, and this circuit is now completed from terminal *q* of panel 1RP over the front point of contact *e* of relay 1A and lead 335 to terminal *a* of storage unit 1ES. The measured value of rolling resistance for the cut in section AT is now continuously applied to the input of electronic storage unit 1ES, but no output voltage appears at terminal *c* of unit 1ES because relay 1H is released.

With relay 1H down, relay TRCTD is again picked up over its previously traced energizing circuit including at this time terminal B of the battery, back contact *f* of relay 1H, lead 358, terminal *b* of panel 1RP, from terminal *b* to terminal *t* of panel 2RP, from terminal *t* of panel 2RP to terminal *b* of panel 2RP over back contact *f* of relay 2H, in a similar manner from terminal *b* to terminal *t* of each of panels 3RP through 5RP, from terminal *b* of panel 5RP to terminal *t* of panel 6RP and thence over back contact *f* of relay 6H and through unit 6RP through 1RP to terminal *s* of panel 1RP and through the winding of relay TRCTD to terminal N of the battery.

As the cut approaches the end of section AT, it is assumed that the rolling resistance measurement has become stabilized and can now be made final and stored. Accordingly, as the cut enters section MR1T (Fig. 2), dropping relay R1TR and causing repeater relay R1TP (Fig. 2) to pick up, the holding circuit for relay RI is broken at the open back point of contact *c* of relay R1TP and relay RI is released.

With relay ATP still up, since at this time the cut is shunting both track sections AT and MR1T, a circuit is completed from terminal B of the battery over front contact *c* of relay ATP, the back point of contact *c* of relay RI, and lead 210 to terminal *p* of panel 1RP, and thence over the front point of contact *c* of relay 1A and through rectifier 211 and the winding of relay 1B to terminal N of the battery. Relay 1B is accordingly picked up and completes a second holding path over its front contact *e* and through panels 1RP through 6RP, to hold up relay TRCTD.

With relay 1B picked up, the second pick-up circuit for relay 1H is completed from terminal B of the battery over front contact *d* of relay 1B and lead 334 to terminal *b* of unit 1ES and through the winding of relay 1H to terminal N of the battery.

Relay 1H will now pick up, interrupting the input circuit for storage unit 1ES and transferring the final value of rolling resistance measurement to the storage circuit of unit 1ES causing an output voltage to appear at terminal *c* of unit 1ES which is proportional to the acceleration of the cut moving in the path of antenna 199 of velocity meter 9.

With relays 1B and 1H up, the previously traced stick circuit for relay 1A is interrupted at the open back point of contact *c* of relay 1B and the open back contact *d* of relay 1H, and relay 1A accordingly releases.

Although there is a voltage at terminal *c* of unit 1ES, relay 1CR does not pick up because its previously traced circuit is interrupted at the open back point of contact *f* of relay 1B.

Relay TRCTD remains up at this time, since its circuit paths through panels 2RP through 6RP have not been affected by the operations up to this point, and its circuit through panel 1RP is maintained over front contact *e* of relay 1B. Relay 1B remains held up over its stick circuit including the back point of contact *d* of relay 1RO and its own front contact *a*. It may now be assumed that the cut clears track section AT and then clears section MR1T, restoring the apparatus to its initial condition except that relays 1B and 1H are picked up and storage unit 1ES contains a measured value of rolling resistance.

During the interval that relay 1A was picked up, during the preceding cycle of operations, leads 231, 232 and 233 were energized in the code combination 001, identifying panel 1RP, by the connection of terminal B of the battery to lead 233 over front contact d of relay 1A. As previously pointed out the utilization of this code forms no part of my present invention.

As will more fully appear from the copending application of William A. Robison, Serial No. 728,230, above referred to, the storage sequence just described is adapted to be repeated for any number of measurements up to 6, and the storage will be made in the first vacant unit in the series from 1RP to 6RP. As will appear from the above description of panel 1RP, in any available unit each of the RO, A, B, CR and H relays are released. In any unit in which a voltage has been stored, the B and H relays are energized and the RO, 1A, and CR relays are released.

To give an example of the manner in which the circuits of my invention seek the first available storage unit, assume that panels 1RP and 3RP through 6RP are occupied with storages, and hence have their B and H relays picked up, and that panel 2RP is unoccupied and hence has all of its relays released. Now assume that a train enters section AT, causing a rolling resistance measurement to appear at terminal b of bias unit 11 and causing relay ATR to drop and relay ATP to pick up.

When relay ATP picks up, relay RI is picked up over the circuits previously described and lead 208 is energized from terminal B of the battery over front contact c of relay ATP and the front point of contact c of relay RI (Fig. 2). Since relay 1B in panel 1RP (Fig. 3) is picked up, lead 208 is connected to terminal r of panel 2RP over a circuit extending from terminal r of panel 1RP over the front point of contact b of relay 1B to terminal d of panel 1RP and hence to terminal r of panel 2RP. A circuit is now completed from terminal r of panel 2RP over the back point of contact b of relay 2B, back contact c of relay 2RO, lead 337, the back point of contact a of relay 2CR, lead 343, back contact b of relay 2A, lead 344, and through the winding of relay 2H to terminal N of the battery.

When relay 2H picks up it transfers the value of voltage from battery 222 to the storage circuit within unit 2ES, and if the unit is operating properly, relay 2CR will pick up. With relay 2CR picked up, relay 2A can pick up over a circuit including the front point of contact a of relay 2CR, back contact c of relay 2RO, and the back point of contact b of relay 2B to energized terminal r. When relay 2A picks up, the code designation 010 is applied to leads 231, 232 and 233 by energizing lead 232 over front contact d of relay 2A. At the same time, due to the pickup of relay 2CR, relay 2H is released as previously described. With relay 2A up, the measured value of rolling resistance from terminal b of unit 11 can be applied to terminal a of unit 2ES over the previously traced circuit including the front point of contact e of relay 2A, lead 215, and front contact a of relay ATP. As soon as the cut enters section MR1T, relay RI will release and relay 2B will be picked up over its previously traced circuit including front contact c of relay ATP, the back point of contact c of relay RI, lead 210, and the front point of contact c of relay 2A. With relay 2B up, relay 2H is picked up over its previously traced circuit, completing the storage cycle, and panel 2RP will then be in the same condition as panels 1RP and 3RP through 6RP.

With all of the storage units occupied in the example just given, it is apparent that any attempt to make an additional storage would not affect the circuits of the panels. This results from the fact that the first operation in the storage cycle of a panel is the pck up of the H relay over a back contact of the B relay and front contact of either the B or the RO relay in each of the preceding panels. Thus, the initial signal for the start of a storage cycle is transferred through each panel to seek a circuit in the succeeding panel when either the panel is occupied and its B relay is up or a voltage is being read out of the panel and its RO relay is up, and if all of the panels are occupied the input signal will be open circuited at the open back point of contact b of relay 6B or the open back point of contact b of relay 6RO.

In order to illustrate the operation of the storage panels when it is desired to read a stored voltage out, assume that a voltage is stored in typical panel 2RP, that relays 2B and 2H are picked up, and that relays 2RO, 2A and 2CR are released. As previously stated the external circuitry for accomplishing the read out operation forms no part of my present invention and it is sufficient to point out here that the operation of this external circuitry will affect a connection from terminal k of panel 2RP through a suitable utilization device to ground, and that terminal B of the battery will be connected through an external circuit to terminal a of panel 2RP. With terminal a energized from terminal B of the battery, relay 2RO will pick up, and if another cut happens to be in section AT at this time, it will stick up over its previously traced stick circuit including its own front contact a, rectifier 218, lead 208, the front point of contact c of relay RI and front contact c of relay ATP to prevent interference by the additional cut while the read out operation is taking place. With relay 2RO up, the output of storage unit 2ES from terminal c is applied to terminal k over front contact f of relay 2RO.

With relay 2RO up, the stick circuit for relay 2B previously traced is interrupted at the open back point of contact d of relay 2RO. Relay 2B is accordingly released. Relay 2H is held up at this time over its previously traced pickup circuit including the front point of contact d of relay 2RO.

When relay 2RO is released as a result of the interruption of the external circuit to terminal a, the circuit for relay 2H is interrupted causing it to release. The apparatus of panel 2RP will thus be restored to its initial condition and make it available for further storage.

As described above, when it is desired to store a voltage representative of a measured value of rolling resistance of a cut traversing track section AT, for example in storage unit 1ES, relay 1H is energized over its previously traced pickup circuit from lead 208. The energization of relay 1H makes available at terminal c of storage unit 1ES the 100 volt potential from battery 214, stored in storage unit 1ES during the period when the equipment was at rest. This 100 volt storage normally would flow from terminal c of unit 1ES through the winding of relay 1CR and over the previously traced pickup circuit for that relay as previously described. I will now assume, however, that storage unit 1ES, due to a fault therein, is incapable of retaining a stored voltage of sufficient potential to energize relay 1CR. Under these conditions, it is apparent that no attempt should be made to store in unit 1ES a voltage representative of the rolling resistance measurement of a cut of railway cars, and that it is expedient to transfer said voltage to the next vacant storage unit for storage as described below.

As previously pointed out, the energization of relay 1H opens the previously traced pickup circuit for relay TRCTD and that relay releases. The release of relay TRCTD connects terminal B of the battery over back contact a of relay TRCTD to terminal t of panel 1RP and over a circuit extending over lead 329 to the movable member of contact c of relay 1CR. Relay 1CR failing to pick up due to insufficient or no power being available at terminal c of unit 1ES because of the aforesaid fault in the unit, the circuit from movable member of contact c over relay 1CR extends over back contact c of relay 1CR, front contact e of relay 1H, lead 330, the back point of contact c of relay 1A, rectifier 211 and the winding of relay 1B to battery terminal N. Relay 1B is, therefore, picked up and it appears that storage panel 1RP already contains a storage. The voltage representative of the measured rolling resistance of the cut of cars in track section AT is thus transferred to terminal $d$ of panel 1RP over the front point of contact $b$ of relay 1B, and is available for storage in panel 2RP, and is so stored if that panel is vacant and storage unit 2ES is capable of retaining a stored voltage.

Panels 2RP through 6RP operate in a manner similar to that described for panel 1RP to reject a rolling resistance measurement voltage if incapable of retaining the voltage due to faulty storage apparatus. The operation of the apparatus in these panels and of relay TRCTD under such circumstances is believed apparent in view of the above description and no further description is deemed necessary.

There is also shown in panels 1RP, 2RP and 6RP, indication lamps designated 1KE, 2KE and 6KE, respectively. Similar lamps are also provided in panels 3RP through 5RP, but for the sake of simplicity are not shown. Each of these lamps is illuminated over the front points of contacts $c$ of their respective B relays by an obvious circuit extending from battery terminal B of the battery over each said front contact $c$ of the proper B relay and through the filament of each lamp to terminal N of the battery. Each of these lamps is thus illuminated when its respective B relay is picked up and indicates that the associated storage panel has a storage therein or is incapable of retaining a storage. Thus if any of the lamps are illuminated when all rolling resistance measurement storages have been read out of the panels, an indication exists that the associated storage unit is faulty.

From this description it is apparent that with apparatus of my invention as shown in the drawings, an arrangement is provided whereby the integrity of each selected storage unit in a series of voltage storage devices is checked when it is desired to store a value of voltage therein and, if the selected unit is determined to be defective, the value of voltage to be stored is transferred for storage in the next vacant and intact storage unit. Means are also provided for at times indicating that a storage unit is defective.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In combination with a signal storage device for storing a measured signal, means for storing in said signal storage device a test signal when said device is void of a measured signal, means for reading out of said signal storage device said stored test signal when it is desired to store a measured signal in said device, checking means responsive only to the readout of said test signal, and means for storing in said signal storage device said measured signal when said last previously mentioned means responds to said readout.

2. In combination with a voltage storage device for storing a measured voltage, means for storing in said voltage storage device a test voltage when said device is void of a measured voltage, means for reading out of said voltage storage device said stored test voltage when it is desired to store a measured voltage in said device, checking means responsive only to the readout of said test voltage, and means for storing in said voltage storage device said measured voltage when said last previously mentioned means responds to said readout.

3. In combination with a signal storage device, means for supplying a test signal to said signal storage device when the device is void of a stored signal, means for interrogating said signal storage device to determine its retention of said test signal when it is desired to store in the device a signal other than a test signal, means for reading out of said signal storage device a retained test signal when the device is interrogated, and means responsive only to the readout of a retained test signal from said signal storage device for supplying to the device said signal other than a test signal.

4. In combination with a voltage storage device, relay means for supplying a test voltage to said voltage storage device when the device is vacant, relay means for reading out of said voltage storage device said test voltage when it is desired to store in the device one of a series of measured voltages, and relay means responsive only to the readout of said test voltage from said voltage storage device for supplying to said device for storage said one of a series of measured voltages when said last mentioned relay means responds to said readout.

5. Apparatus for checking the integrity of a device for storing measured values of voltage comprising, in combination, a source of voltage of a predetermined value, means for supplying from said source to said voltage storage device said voltage of a predetermined value when said device is void of a storage of a measured value of voltage, means to read out from said voltage storage device a stored voltage of said predetermined value when it is desired to store one of said measured values of voltage in said device, integrity checking means responsive only to said voltage readout from said voltage storage device, means for supplying to said voltage storage device said one of said measured values of voltage when said integrity checking means responds to said voltage readout, and means for transferring said one of said measured values of voltage to one of a series of succeeding voltage storage devices when said integrity checking means fails to respond to said voltage readout.

6. In a signal storage system in which each of a series of consecutive signals is supplied for storage to the first of a series of signal storage devices void of a stored signal, in combination, means for supplying a test signal to each device of said series of signal storage devices void of a stored signal, means for selecting one of said series of signal storage devices for supplying thereto one of said series of consecutive signals, means for interrogating said selected signal storage device to determine its retention of said test signal supplied thereto, means for reading out of said selected signal storage device a retained test signal when said device is interrogated, means responsive only to the readout of a retained test signal from said selected signal storage device for supplying thereto said one of said series of consecutive signals, and means for successively selecting another one of said series of signal storage devices for supplying thereto said one of said series of consecutive signals when a readout of the test signal supplied to each precedingly selected signal storage device fails.

7. In a voltage storage system in which each of a series of successive values of voltage is supplied for storage to a selected vacant device of a series of voltage storage devices, in combination, means for supplying a test value of voltage to each vacant device of said series of voltage storage devices, means for selecting one of said series of voltage storage devices for supplying thereto one of said series of successive values of voltage, means for interrogating said selected voltage storage device to determine its retention of said test value of voltage supplied thereto, means for reading out of said selected voltage storage device a retained test value of voltage when said device is interrogated, means responsive only to the readout of a full test value of voltage from said selected voltage storage device for supplying to said device said one of said series of successive values of voltage, and means for successively selecting another of said series of voltage storage devices for supplying to said other selected device said one of said series of successive values of voltage when a readout of the full test value of voltage supplied to each precedingly selected voltage storage device fails to occur.

8. In combination with a storage device for storing any one of a series of values of voltage, a control relay, means for supplying to an input terminal of said device a voltage of a predetermined value when said control relay is released, a normally released checking relay requiring for pickup a voltage of said predetermined value through its winding, means for picking up said control relay, means for connecting the winding of said checking relay to an output terminal of said device when said control relay is picked up, and means for supplying to said input terminal of said device one of said series of values of voltage when said checking relay is picked up.

9. In combination with a storage device for storing any one of a series of values of voltage, a first relay, means comprising a back contact of said first relay for supplying to an input terminal of said storage device a voltage of a predetermined value, a second relay requiring for pick-up a voltage of said predetermined value through its winding, means for picking up said first relay, means comprising a front contact of said first relay for connecting an output terminal of said storage device to the winding of said second relay, and means comprising a front contact of said second relay for supplying to said input terminal of said storage device one of said series of values of voltage.

10. In a voltage storage system of the type in which each of a succession of voltages is stored in the first of a series of voltage storage devices void of a stored voltage, in combination, means for storing a test voltage of a predetermined value in each said storage device when each said device is void of a storage, means for transferring each said test voltage from each said storage device to the winding of a released checking relay associated with each said device when one of said succession of voltages is attempted to be stored in said associated device, means for storing said one of said succession of voltages in said associated device when said checking relay picks up, and means for transferring said one of said succession of voltages to the next succeeding void storage device when said checking relay remains released.

11. In combination with a series of storage devices each capable of storing any one of a series of values of voltage, a control relay for each said storage device, means for supplying to an input terminal of each said storage device a voltage of a predetermined value when its associated control relay is released; a normally released checking relay for each said storage device, each said relay requiring for pickup a voltage of said predetermined value through its winding; means for picking up the said control relay for the first device of said series of storage devices; means for connecting the winding of the said checking relay for the first device of said series of storage devices to an output terminal of said first device when the said control relay for said first device is picked up, means for supplying to the said input terminal of the said first device of said series of devices one of said series of values of voltage when said checking relay is picked up, and means for picking up the said control relay for the second device of said series of storage devices when the said control relay for the first device of said series of storage devices is picked up and the checking relay for the first device of said series of storage devices remains released.

12. In a voltage storage system in which each one of a series of values of voltage is stored in each selected one of a series of capacitors, in combination; first, second, third and fourth relays associated with each said capacitor, a source of voltage associated with each said capacitor, a circuit for storing a value of voltage in each said capacitor comprising back contacts of the said first and third relays and said sources of voltage associated with each capacitor, a circuit comprising contacts of said second relays for selecting one of said series of capacitors for storing one of said series of values of voltage, a circuit comprising a back contact of said second relay associated with said selected capacitor for picking up said third relay associated with the selected capacitor, a circuit comprising a front contact of said picked-up third relay for discharging said value of voltage stored in said selected capacitor through the winding of said fourth relay associated with the selected capacitor, a circuit comprising a front contact of said fourth and a back contact of said second relays associated with said selected capacitor for picking up said first relay associated with the selected capacitor, a circuit comprising a front contact of said first relay associated with said selected capacitor for picking up said second relay associated with the selected capacitor, and a circuit comprising a front contact of said first relay associated with said selected capacitor for supplying said one of said series of values of voltage to the selected capacitor.

13. In a voltage storage system comprising a series of sets of apparatus each including a source of test voltage, a voltage storage device, and first, second, third and fourth relays; in combination, means for selecting one of said sets of apparatus for one of a series of values of voltage to be stored, means comprising contacts of said selected first and third relays for storing said selected test voltage in said selected voltage storage device when said relays are released; means comprising contacts of said selected second, third and fourth relays for picking up said first relay when said second, third and fourth relays are released, means comprising contacts of said selected first relay and said selected test voltage stored in said selected storage device for picking up said selected second relay when said first relay is picked up, means comprising contacts of said selected second relay and said selected fourth relay for picking up said selected third relay when said second relay is picked up and said fourth relay is released, means comprising a contact of said selected third relay for storing said one of a series of values of voltages in said selected voltage storage device when said third relay is picked up, means comprising a contact of said selected third relay for picking up said selected fourth relay when said third relay is picked up, a normally picked-up transfer relay, means comprising a contact of said selected first relay for releasing said transfer relay when said first relay is picked up, means comprising contacts of said transfer relay and said selected second relay for picking up said selected fourth relay when said transfer and said second relays are released, and means comprising a contact of said selected fourth relay for picking up said selected first relay when said fourth relay is picked up.

14. In combination with a voltage storage device comprising a storage unit, a storage relay, an input terminal and an output terminal, said storage unit being connected to said output terminal when said storage relay is picked up and to said input terminal when said relay is released; an arrangement of storage control and checking apparatus comprising a source of voltage of a predetermined value, a checking relay responsive only to a voltage of said predetermined value, first and second control relays, and a normally picked-up transfer relay; means for connecting said source of voltage of a predetermined value to said input terminal when said storage relay and said first control relay are released, means for picking up said storage relay when it is desired to store a voltage of a measured value in said storage device and said second control relay is released, means for connecting said output terminal to the winding of said checking relay when said storage relay is picked up, means for picking up said first control relay when said checking relay is picked up, means for releasing said storage relay when said first control relay is picked up, means for connecting said voltage of a measured value to said input terminal when said first control relay is picked up, means for picking up said second control relay when said first control relay is picked up, means for releasing said transfer relay when said storage relay is picked up; means for picking up said second control relay when said transfer relay, said checking relay and said first control relay are released, means for releasing said first control relay when said second control relay is picked up, and means for transferring said voltage of a measured value to a succeeding arrangement of control and checking apparatus associated with a succeeding voltage storage device when said second control relay is picked up previous to the pickup of said first control relay.

15. In combination with a voltage storage device comprising a capacitor, a storage relay, an input terminal and an output terminal, said capacitor being connected to said output terminal when said storage control relay is picked up and to said input terminal when said relay is released; a source of test voltage of a predetermined minimum value, a first control relay, a second control relay, a third control relay and a fourth control relay, a circuit comprising a back contact of said second control relay and a back contact of said storage relay in series for connecting said source of test voltage to said input terminal of said voltage storage device, a first pickup circuit comprising a back contact of said storage relay for picking up said fourth control relay; a first pickup circuit comprising back contacts of said first, second, and third control relays in series for picking up said storage relay when it is desired to store one of a series of measured values of voltage in said voltage storage device; a circuit comprising a back contact of said third control relay for connecting said output terminal of said voltage storage device to the winding of said first control relay and picking up the first control relay when said capacitor associated with said voltage storage device has a voltage charge of at least said predetermined minimum value, a circuit comprising a front contact of said first control relay and a back contact of said third control relay in series for picking up said second control relay; a stick circuit for said second control relay comprising a back contact of said storage relay and a back contact of said third control relay in a multiple circuit, and a front contact of said second control relay in series with said multiple circuit; a first pickup circuit for said third control relay comprising a front contact of said second control relay; a second pickup circuit for said third control relay comprising in series a back contact of said second control relay, a front contact of said storage relay, a back contact of said fourth control relay, and a back contact of said second control relay; a third pickup circuit for said third control relay comprising in series a front contact of said first control relay, and a back contact of said storage relay; a stick circuit for said third control relay comprising one of its own front contacts, a second pickup circuit for said fourth control relay comprising a front contact of said third control relay, a second pickup circuit for said storage relay comprising a front contact of said third control relay, a circuit comprising a front contact of said second control relay for supplying one of a said series of measured values of voltage to said input terminal of said voltage storage device; and a circuit comprising a front contact of said third control relay for transferring each of said series of measured values of voltage, subsequent to said one of said series, to one of a succession of voltage storage devices and associated apparatus each identical to the voltage storage device and associated apparatus just described.

References Cited in the file of this patent

UNITED STATES PATENTS 2,817,829 Lubkin _____ Dec. 24, 1957